United States Patent [19]
Ekker

[11] Patent Number: 5,509,338
[45] Date of Patent: Apr. 23, 1996

[54] SAW GUIDE FOR CUTTING TRUSS JOIST I-BEAMS

[76] Inventor: Shawn Ekker, P.O. Box 964, Cedar City, Utah 84721

[21] Appl. No.: 187,643

[22] Filed: Jan. 27, 1994

[51] Int. Cl.⁶ ........................................................ B27B 9/04
[52] U.S. Cl. ........................... 83/745; 83/522.15; 83/574; 83/581
[58] Field of Search ........................ 83/745, 574, 522.15, 83/581, 522.18, 522.19

[56] References Cited

U.S. PATENT DOCUMENTS

| | | |
|---|---|---|
| 257,041 | 4/1882 | Meyers . |
| 1,535,042 | 4/1925 | Sadler . |
| 4,726,274 | 2/1988 | Pitoni et al. ............................ 83/745 |
| 4,751,865 | 6/1988 | Buckalew ............................... 83/745 |
| 5,155,918 | 10/1992 | Hummer ................................. 33/430 |

*Primary Examiner*—Rinaldi I. Rada
*Attorney, Agent, or Firm*—Thorpe, North & Western

[57] ABSTRACT

A guide for cutting a truss joist I-beam with a hand-held power saw such as a worm drive, hypoid drive, or circular saw is disclosed. The guide comprises a base positionable along a top surface and an inner edge of one chord of the I-beam, a mechanism mounted on the base for securely holding the base to the chord, and a cutting guide pivotally mounted on the base for guiding a hand-held power saw at a selected angle in cutting the I-beam. The holding mechanism includes a handle extending from the base and a pivot arm pivotally coupled to the base. The pivot arm has a gripping end for contacting the chord and a pivot handle for pulling upwardly toward the handle for causing the gripping end to pivot into contact with the chord. The cutting guide comprises a face plate having a flat bottom surface for bridging and resting upon the tops of the chords of the I-beam and a flat front surface generally perpendicular to the bottom surface of the face plate for guiding a side support edge of a hand-held power saw when cutting the I-beam, a shoe support mounted on and extending forwardly from the bridge plate having a flat top surface coplanar with the bottom surface of the bridge plate for guiding a lower support edge of the hand-held power saw, and a mechanism for setting the saw guide for cutting the I-beam at a selected angle.

9 Claims, 2 Drawing Sheets

SAW GUIDE FOR CUTTING TRUSS JOIST I-BEAMS

BACKGROUND OF THE INVENTION

This invention relates to apparatus and a method for cutting truss joist I-beams. More particularly, the invention relates to apparatus and a method for guiding the cutting of truss joist I-beams at selected angles with a hand-held power saw such as a worm drive, hypoid drive, or circular saw so that the saw is positioned and held on a true course during the cutting of the I-beams.

I-beams are beams or girders with a cross section formed in the shape of a capital letter I. The narrow portion of the I-beam is known as a web, and the wider or enlarged portions are termed chords. I-beams are used in construction because they are lighter in weight, more consistent, and can be longer than conventional lumber, such as a beams having a rectangular cross section. Joists are parallel horizontal beams set from wall to wall to support the boards of a floor or ceiling. In modern construction practice it is common to prefabricate roof trusses comprising joists and other structural framework that support the exterior surface at the top of a building. The trusses are then hoisted into place atop bearing walls.

Conventionally, truss joist I-beams to be cut at an angle or miter have been moved to a stationary radial arm saw or sliding compound miter saw to accomplish the cut. This is a very cumbersome and time-consuming operation in a construction project. Carrying the saw to the truss joist I-beam would be better because then the I-beam need not be moved until it is ready for installation. In cutting truss joist I-beams with a hand-held worm drive, hypoid drive, or circular saw, cutters frequently, to obtain a straight cut, hold a piece of scrap material across the I-beam by hand or with a pair of clamps as a cutting guide. The assembling of the required parts and frequent misplacement of the several parts cause unwanted delay in the rate of production. If the scrap material is held by hand, there may be slippage resulting in an uneven cut. Further, when using a hand-held power saw to cut a truss joist I-beam, particularly when cutting across the joint between chord and web, the saw has a tendency to become tilted at an untoward angle, thus causing the cut to be uneven. The I-beam may also bind the saw blade, causing the saw to kick back toward the user, which is a significant safety hazard. It is also difficult to hold or clamp the scrap material at selected angles.

In view of the foregoing, it will be appreciated that providing apparatus and a method for cutting of truss joist I-beams with a hand-held power saw, wherein a guide is clamped securely to the I-beam, the saw is positioned and held on a true course when cutting the I-beam, and cutting angles are readily selectable, would be a significant advancement in the art.

OBJECTS AND SUMMARY OF THE INVENTION

It is an object of the present invention to provide apparatus and a method for guiding the cutting of truss joist I-beams with a hand-held worm drive, hypoid drive, or circular saw.

It is also an object of the invention to provide apparatus and a method for positioning and holding a hand-held power saw on a true course when cutting through a truss joist I-beam.

It is another object of the invention to provide apparatus and a method for cutting a truss joist I-beam at a selected angle with a hand-held power saw.

It is still another object of the invention to provide apparatus and a method for holding a saw guide and a truss joist I-beam securely in place while carrying out a sawing operation.

It is yet another object of the invention to accelerate the rate of production of cutting truss joist I-beams.

It is also an object of the invention to improve the safety of cutting truss joist I-beams with a hand-held power saws by reducing the binding of the saw blade and kick back of the saw toward the user.

These an other objects are achieved by a saw guide for cutting a truss joist I-beam with a hand-held worm drive, hypoid drive, or circular saw, wherein the guide comprises a base that includes a mechanism for positioning the base along a top surface and an inner edge of a chord of the I-beam, an attachment mechanism mounted on the base for reversibly attaching the base to the chord, and a cutting guide pivotally mounted on the base for guiding the hand-held power saw at a selected angle in cutting the I-beam. The cutting guide includes a face plate comprising an elongate member having a flat bottom surface for bridging and resting upon the top surface of the chords of the I-beam and a flat front surface generally perpendicular to the bottom surface for guiding a side support edge of the hand-held power saw when cutting the I-beam. A shoe support is mounted on the face plate comprising a forwardly extending member having a flat top surface coplanar with the bottom surface of the face plate for guiding a lower support edge of the hand-held power saw when cutting the I-beam. A mechanism for setting the saw guide for cutting the I-beam at a selected angle is also included in the cutting guide.

Another aspect of the saw guide is a mechanism for positioning the saw guide on a chord of the I-beam comprising an elongate member having a flat bottom surface and a ledge extending generally perpendicularly downward from the flat bottom surface to form a shoulder. The shoulder is positionable against an inner edge of the chord and the bottom surface is positionable against the top of the chord, thus aligning the saw guide on the I-beam.

Another aspect of the saw guide is a mechanism for reversibly attaching the saw guide to the I-beam including a handle mounted on the base for gripping by a user and a pivot grip comprising a pivot arm pivotally attached to the base. The pivot arm includes a gripping end disposed at one end of the pivot arm for contacting the chord of the I-beam when the saw guide is placed on the I-beam and a pivot handle disposed at the other end of the pivot arm for grasping and pulling upwardly toward the handle to cause the gripping end to pivot into contact with the chord to grip and securely hold the saw guide on the I-beam.

A method for cutting a truss joist I-beam with a hand-held power saw comprises the steps of (a) positioning and securely holding the saw guide on the I-beam; (b) selecting the angle of the saw guide with respect to the I-beam; (c) positioning the hand-held power saw against the saw guide so that the side support edge of the hand-held power saw is securely held against the front surface of the face plate and the lower support edge of the hand-held power saw is securely held against the top surface of the chord and the top surface of the shoe support; and (d) moving the hand-held power saw crosswise of the I-beam while continuing to hold the side support edge of the hand-held power saw against the front surface of the face plate to cut the I-beam so that the saw blade is the only portion of the hand-held power saw to contact the web. Steps (a) and (b) can occur in either order.

DETAILED DESCRIPTION OF THE INVENTION

Before the present apparatus and method for guiding the cutting of truss joist I-beams with a hand-held power saw are disclosed and described, it is to be understood that this invention is not limited to the particular process steps and materials disclosed herein as such process steps and materials may vary somewhat. It is also to be understood that the terminology used herein is used for the purpose of describing particular embodiments only and is not intended to be limiting since the scope of the present invention will be limited only by the appended claims and their equivalents.

Figure 1:
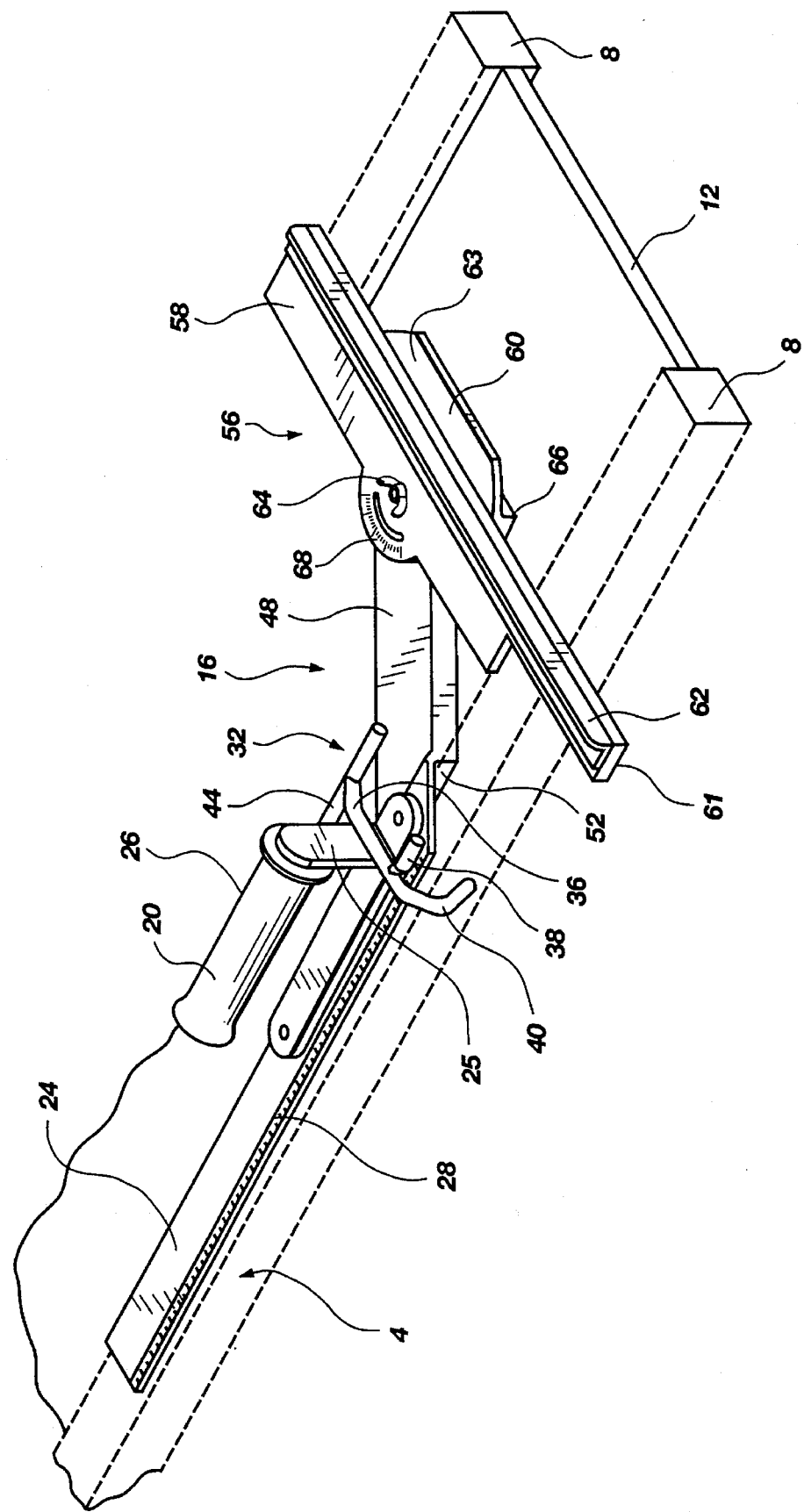
FIG. 1 shows a perspective view of a saw guide for cutting truss joist I-beams according to the present invention.

FIG. 1 shows a truss joist I-beam 4 consisting of chords 8 at each end of a web 12. A guide 16 is provided for insertion on the truss joist I-beam 4 to allow for guiding a hand-held power saw such as a worm drive, hypoid drive, or circular saw (FIG. 5) in the cutting of the I-beam 4. Referring to FIGS. 1–4, the guide 16 includes a handle 20 mounted on top of a measuring rule and base 24. The handle 20 contains an attachment portion 25 that is attached to the rule and base 24 and extends upwardly therefrom, and a gripping portion 26 that extends from the attachment portion 25 such that the gripping portion is generally parallel to the rule and base 24. The gripping portion 26 is the part of the handle 20 that is gripped by a user's hand. This arrangement provides room for the user's hand to securely grasp the handle 20 and leverage for moving the guide 16 into position on the I-beam 4. The rule and base 24 comprise an elongate member including a scale 28 formed along an edge thereof by which a selected length of I-beam 4 to be cut can be measured. The rule and base 24 has a flat bottom surface 30 that is placed on top of the chord 8 for proper positioning of the guide 16. A shoulder or ledge 52 extends generally perpendicularly downward from the bottom surface of the rule and base 24 along the length of the rule and base 24. This shoulder 52 also assists in positioning of the guide 16 on the I-beam 4 and will be described in more detail momentarily. A pivot grip 32 includes a pivot arm 36 pivotally mounted on the rule and base 24 at a pivot 38, a gripping end 40 disposed at one end of the pivot arm 36 for contacting the chord 8 of the I-beam 4 when the guide 16 is placed on the I-beam, and a pivot handle 44 disposed on the other end of the pivot arm 36 for grasping and pulling upwardly toward the handle 20 to cause the gripping end 40 to pivot into contact with the chord 8 to grip and securely hold the guide 16 on the I-beam. The pivot handle 44 extends generally parallel to the handle 20 so that the user can grip both the handle 20 and the pivot handle 44 with one hand and apply upward pressure on the pivot handle 44.

A support brace 48 extends from one end of the rule and base 24 at an angle forwardly and laterally, and forms a portion of the shoulder or ledge 52 that extends the full length of the rule and base 24. This arrangement permits placement of the shoulder 52 in contact with an inner side of the chord 8 and the bottom 30 of the rule and base 24 on top of the chord 8 for aligning the rule and base 24.

Rotatably mounted on the free end of the support brace 48 is a cutting guide 56 comprising a face plate 58 and a shoe support 60. The face plate 58 comprises an elongate member having a flat bottom side 61 that is wide enough to span or bridge the two chords 8 of the I-beam 4. The face plate 58 also presents a flat front face 62 against which the hand-held power saw will be held to cut the I-beam. The plane of the flat front face 62 and the plane of the flat bottom side 61 of the face plate 58 are generally perpendicular to each other. The shoe support 60 is also affixed to the face plate 58 and extends forwardly therefrom. The top side 63 of the shoe support 60 forms a flat surface that is coplanar with the bottom side 61 of the face plate 58. The shoe support 60 is generally centrally located with respect to the long dimension of the face plate 58, and is shorter in width so that the shoe support 60 fits between the two chords 8 of the I-beam 4 when the guide 16 is in place. The bottom side 66 of the shoe support 60 makes contact with the web 12 to help support the face plate 58. The cutting guide 56 is pivotally attached to the support brace 48 by a bolt and wing nut 64. The angle of the cutting guide 56 across the I-beam 4 may be adjusted by loosening the wing nut 64, rotating the cutting guide 56 to the selected angle, and then retightening the wing nut 64. Advantageously, angle markings 68 on the cutting guide 56 help in selection of the angle at which the cut will be made. It will be apparent to a person skilled in the art that other mechanisms, besides a bolt and wing nut 64, of pivotally attaching the cutting guide 56 to the support brace 48 could be used and such mechanisms are considered within the scope of the invention. Further, although the cutting guide 56 is described as comprising distinct face plate 58 and shoe support 60 components, it will be appreciated that these components of the cutting guide 56 could be fused into a single component and such arrangement is considered within the scope of the invention. Separate interchangeable face plates of different sizes can be constructed to accommodate truss joist I-beams of different widths.

In use, the guide 16 is placed in position on a truss joist I-beam 4 that is to be cut. The shoulder 52 is placed against an inside surface of one of the chords 8 of the I-beam 4 so that the rule and base 24 is positioned on top of that chord 8. The cutting guide 56 is placed on top of the two chords 8 of the I-beam 4 so that the shoe support 60 is positioned between the chords 8. The angle at which the I-beam 4 is to be cut is then selected. This is accomplished by loosening the wing nut 64, pivoting the cutting guide 56 to the selected angle, and retightening the wing nut 64. Alternatively, the angle at which the I-beam is to be cut could be selected before placing the guide 16 in position. Once the guide 16 is positioned and the angle selected, the user grasps the handle 20 with one hand and simultaneously with the same hand grasps the pivot handle 44 and pulls it upward toward the handle 20. This action causes the pivot arm 36 to pivot, the gripping end 40 of the pivot arm 36 being brought into contact with the chord 8. The force of the gripping end 40 against the chord 8 pushes the chord 8 against the shoulder 52, thus pinching the chord 8 between the shoulder 52 and the gripping end 40 and holding the guide 16 securely against the I-beam 4. It will be appreciated that the greater the force used in pulling the pivot handle 44 upward toward the handle 20, the more securely the guide 16 and I-beam 4 are held together.

Figure 5:
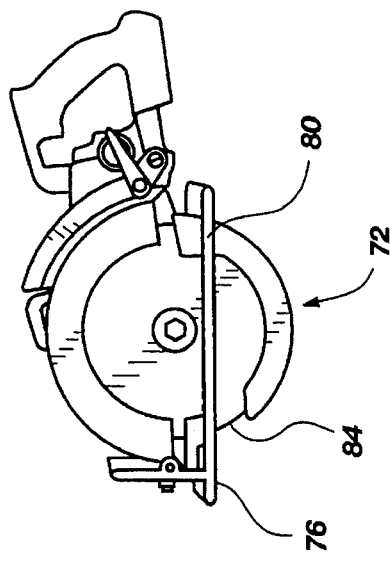
FIG. 5 shows a perspective view of a worm drive saw, a hand-held power saw of the type used with the saw guide of the present invention for cutting truss joist I-beams.
Figure 4:
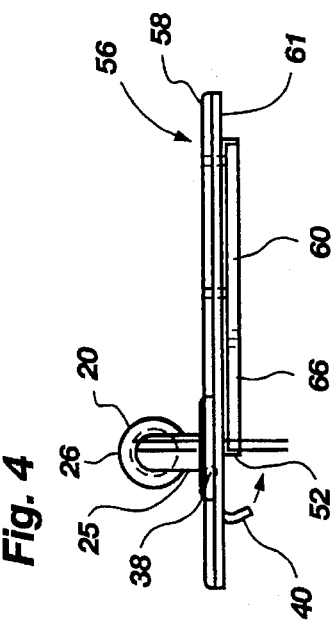
FIG. 4 shows a front elevational view of the saw guide of FIG. 1.
Figure 2:
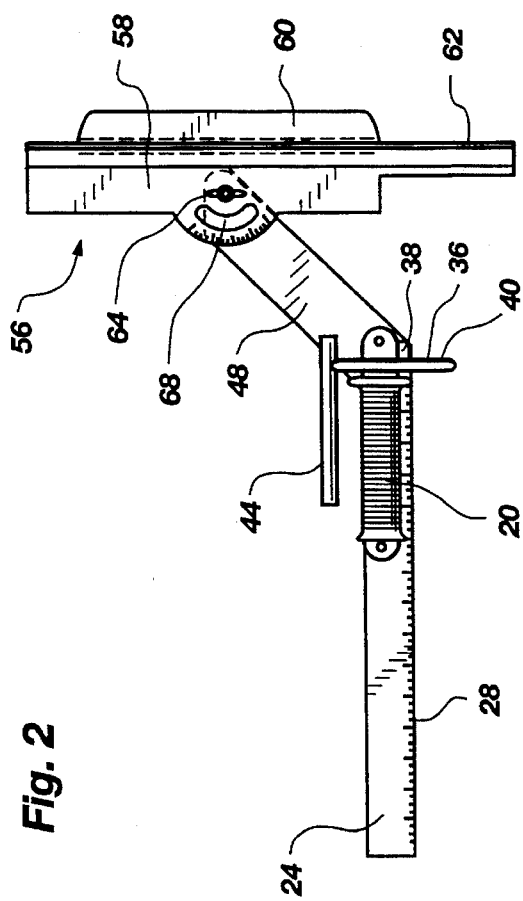
FIG. 2 shows a top view of the saw guide of FIG. 1.
Figure 3:
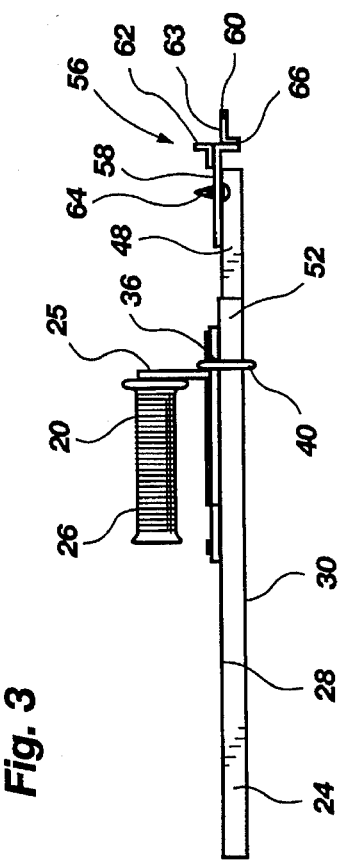
FIG. 3 shows a side elevational view of the saw guide of FIG. 1.

While maintaining upward pressure on the pivot handle 44 toward the handle 20 with one hand, with the other hand the user positions a hand-held power saw 72 such as a worm drive, hypoid drive, or circular saw (FIG. 5) so that a lower support edge 76 of the saw 72 contacts one of the chords 8 of the I-beam 4 and also the support shoe 60. A side support edge 80 of the saw 72 is positioned to contact the front face 62 of face plate 58. With the saw 72 in position and the saw blade 84 rotating, the saw 72 may then be moved crosswise of the I-beam 4 to cut the I-beam 4 without any portion of the saw 72 other than the saw blade 84 coming into contact with the web 12. In other words, the two chords 8 and the support shoe 60 provide an essentially flat surface over which the hand-held power saw 72 may be moved to cut the I-beam 4. The saw blade 84 does not come into contact with the support shoe 60 because the saw blade 84 is offset from the side support edge 80 of the saw 72 (FIG. 5). Maintaining the side support edge 80 of the saw 72 against the front face 62 of the face plate 58 and the lower support edge 76 of the saw 72 against the chords 8 and top side 63 of the shoe support 60 results in a straight cut of the I-beam 4 at the selected angle. After the cut is completed, the upward pressure on the pivot handle 44 can be relieved so that the guide 16 can be removed from the I-beam 4.

I claim:

1. A saw guide for cutting with a hand-held power saw a truss joist I-beam having first and second chords connected by a web comprising a base including means for positioning said base along a top surface and an inner edge of said first chord of said I-beam;

means for releasably attaching said base to said first chord of said I-beam, said attachment means being mounted on said base; and a cutting guide pivotally mounted on said base for guiding the hand-held power saw at a selected angle in cutting said I-beam, the cutting guide comprising a face plate comprising an elongate member having a flat bottom surface for bridging and resting upon said top surface of said first chord and a top surface of said second chord, and a flat front surface generally perpendicular to said bottom surface for guiding a side support edge of the hand-held power saw when cutting the I-beam, a shoe support mounted on said face plate comprising a forwardly extending member having a flat top surface coplanar with said bottom surface of said face plate for guiding a lower support edge of the hand-held power saw when cutting the I-beam, and means for setting the cutting guide for cutting the I-beam at a selected angle.

2. The saw guide of claim 1 wherein said base positioning means comprises an elongate member, having a flat bottom surface and an edge, and a ledge extending generally perpendicularly to said flat bottom surface downward from said edge to form a shoulder, said shoulder being positionable against said inner edge of said first chord and said bottom surface being positionable against said top of said first chord.

3. The saw guide of claim 2 wherein said attachment means comprises a handle mounted on said base for gripping by a user of said saw guide, and a pivot grip comprising a pivot arm pivotally attached to said base including a gripping end disposed at a first end of the pivot arm for contacting said first chord of the I-beam when said saw guide is placed on said I-beam, and a pivot handle disposed at a second end of said pivot arm for grasping and pulling upwardly toward said handle to cause said gripping end to pivot into contact with said first chord to grip and securely hold the saw guide on the I-beam.

4. The saw guide of claim 3 wherein said cutting guide is mounted on said base through a support brace attached to said base and extending forwardly and laterally therefrom, said support brace forming at one end a portion of said shoulder for positioning said base against the inner edge of said first chord.

5. The saw guide of claim 4 wherein said support brace includes a free end and said cutting guide is pivotally mounted on said free end of said support brace.

6. The saw guide of claim 5 wherein said setting means comprises angle markings on said cutting guide for indicating relative positions of the cutting guide and the support brace for achieving a selected cutting angle across the I-beam.

7. The saw guide of claim 6 wherein said face plate further comprises a center, wherein said shoe support is positioned near the center of said face plate to thereby fit between said first and second chords, and said shoe support further comprises a bottom surface for contacting said web to help support said cutting guide.

8. A saw guide for cutting with a hand-held power saw a truss joist I-beam having a chord with an inner and outer edge, said guide comprising a base including means for positioning the base along a top surface and the inner edge of the chord of the I-beam;

a cutting guide mounted on the base for guiding the hand-held power saw at a selected angle in cutting the I-beam; and means for releasably attaching the base to the chord of the I-beam, wherein the attaching means comprises a handle attached to and extending away from the base, and a pivot grip including a pivot arm pivotally mounted on the base, the pivot arm having a gripping end disposed at a first end of the pivot arm for contacting the chord of the I-beam and a pivot handle disposed at a second end of said pivot arm which, when pulled toward the handle, causes the gripping end to move into contact with the chord to hold the I-beam on the saw guide.

9. The saw guide of claim 8 wherein the handle contains an attachment portion extending upwardly from the base and a gripping portion extending from the attachment portion generally parallel to the base, and wherein the pivot handle is disposed generally parallel to the gripping portion of the handle so that one hand can be used to grasp the gripping portion of the handle and the pivot handle for pulling the pivot handle upwardly toward the gripping portion of the handle to pivot the gripping end against the chord.

* * * * *